United States Patent
Chen (10) Patent No.: US 7,953,056 B2
(45) Date of Patent: May 31, 2011

(54) POLLING METHOD COMPLIANT TO BLUETOOTH PROTOCOL FOR INCREASING TRANSFER EFFICIENCY AND SYSTEM THEREOF

(75) Inventor: Sheng-Chung Chen, Hsin-Chu (TW)

(73) Assignee: PixArt Imaging Inc., Science-Based Industrial Park, Hsin-Chu (TW)

( * ) Notice: Subject to any disclaimer, the term of this patent is extended or adjusted under 35 U.S.C. 154(b) by 161 days.

(21) Appl. No.: 12/547,485

(22) Filed: Aug. 26, 2009

(65) Prior Publication Data
US 2011/0051743 A1 Mar. 3, 2011

(51) Int. Cl.
*H04Q 7/24* (2006.01)
*H04L 12/42* (2006.01)

(52) U.S. Cl. .................... 370/338; 370/449

(58) Field of Classification Search .......... 370/338, 370/432, 443, 447, 449, 461, 473, 474
See application file for complete search history.

(56) References Cited

U.S. PATENT DOCUMENTS

| | | | |
|---|---|---|---|
| 7,330,445 B2* | 2/2008 | Park | 370/314 |
| 7,496,077 B2* | 2/2009 | Zhodzishsky et al. | 370/338 |
| 7,548,552 B2* | 6/2009 | Shvodian et al. | 370/449 |
| 7,680,520 B2* | 3/2010 | Ruuska et al. | 455/574 |
| 7,739,375 B2* | 6/2010 | Hlasny | 709/224 |
| 7,839,833 B2* | 11/2010 | Linsky et al. | 370/338 |
| 2006/0018319 A1 | 1/2006 | Palin et al. | |
| 2006/0159118 A1* | 7/2006 | Shvodian et al. | 370/449 |
| 2007/0177567 A1* | 8/2007 | Parys | 370/346 |
| 2007/0268875 A1* | 11/2007 | Lee et al. | 370/338 |

* cited by examiner

*Primary Examiner* — Andrew Lee
(74) *Attorney, Agent, or Firm* — Winston Hsu; Scott Margo (57) ABSTRACT

A polling method compliant to Bluetooth protocol is utilized for increasing transfer efficiency. In a Bluetooth piconet, a master queries each slave to determine the slaves supporting a predetermined protocol. The master determines a predetermined address as the instruction of the predetermined protocol. When the master sends a polling packet with the predetermined address to the supporting slaves, the supporting slaves can respond in sequence. In this way, even if the supporting slaves increase, the master only has to send one single polling packet for all the supporting slaves responding, increasing the transfer efficiency.

19 Claims, 8 Drawing Sheets

| MA | SL₁ | SL₂ | SL₃ | MA | SL₁ | SL₂ | SL₃ |
|----|-----|-----|-----|----|-----|-----|-----|
| SPP | RP₁ | RP₂ | RP₃ | SPP | RP₁ | RP₂ | RP₃ |
| TS₀ | TS₁ | TS₂ | TS₃ | TS₄ | TS₅ | TS₆ | TS₇ |

SL₁~SL₃ support the predetermined protocol

POLLING METHOD COMPLIANT TO BLUETOOTH PROTOCOL FOR INCREASING TRANSFER EFFICIENCY AND SYSTEM THEREOF

BACKGROUND OF THE INVENTION

1. Field of the Invention

The present invention relates to a polling method, and more particularly, to a polling method compliant to Bluetooth protocol for increasing transfer efficiency.

2. Description of the Prior Art

In Bluetooth protocol, when a master has to continuously request slaves to transfer data, the master can poll the slaves. For example, the master is a game console, and the slaves are the joysticks corresponding to the game console. In a multi-player game, each joystick has to continuously transfer vast control signals sent by the users through the joysticks to the game console, so that the game console can accordingly control the characters representing the users in the game. Thus, the game console (the master) polls each joystick (slave) for obtaining the control signals at the time.

Figure 1:
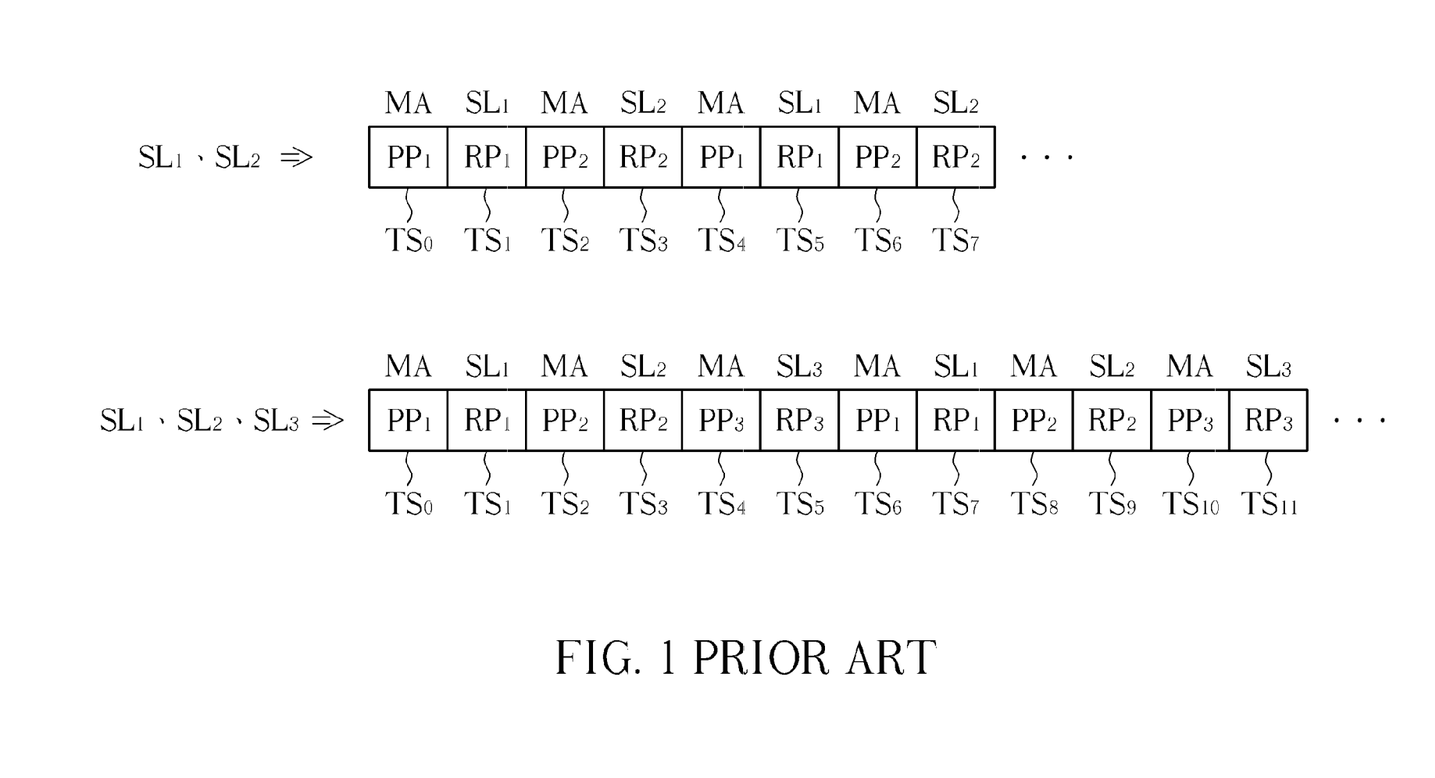
FIG. 1 is a diagram illustrating a conventional polling method.

Please refer to FIG. 1. FIG. 1 is a diagram illustrating a conventional polling method. In FIG. 1, the period length of the time slots $TS_0 \sim TS_{11}$ are all equal to a cycle T (for example, 625 μs). In the upper part of FIG. 1, the master MA polls the slaves $SL_1$ and $SL_2$, wherein the master MA and the slaves $SL_1$, and $SL_2$ belong to the same Bluetooth piconet, and the master MA assigns an address $ADDR_1$ to the slave $SL_1$, and an address $ADDR_2$ to the slave $SL_2$, respectively. First, the master MA sends a polling packet $PP_1$ in the polling time slot $TS_0$, wherein the polling packet $PP_1$ has the address $ADDR_1$. Hence, when the slave $SL_1$ receives the polling packet $PP_1$, the slave $SL_1$ can determine that the master MA requests the slave $SL_1$ to respond according to the address $ADDR_1$ included in the polling packet $PP_1$. Meanwhile, the slave $SL_1$ sends a responding packet $RP_1$ (corresponding to the polling packet $PP_1$) for transferring data to the master MA in a responding time slot $TS_1$ adjacent to the polling time slot $TS_0$. Next, the master MA sends a polling packet $PP_2$ in the polling time slot $TS_2$, wherein the polling packet $PP_2$ has the address $ADDR_2$. Similarly, the slave $SL_2$ can determine that the master MA requests the slave $SL_2$ to respond according to the address $ADDR_2$ included in the polling packet $PP_2$. Hence, the slave $SL_2$ sends a responding packet $RP_2$ (corresponding to the polling packet $PP_2$) for transferring data to the master MA in a responding time slot $TS_3$ adjacent to the polling time slot $TS_2$. Consequently, the master MA can poll the slaves $SL_1$ and $SL_2$ for one time every four time slots. In the lower part of FIG. 1, the master MA polls the slaves $SL_1$, $SL_2$, and $SL_3$, wherein the master MA and the slaves $SL_1$, $SL_2$, and $SL_3$ belong to the same Bluetooth piconet, and the master MA assigns the addresses $ADDR_1$, $ADDR_2$, and $ADDR_3$ to the slaves $SL_1$, $SL_2$, and $SL_3$, respectively. The method of the master MA polling the slaves $SL_1$, $SL_2$, and $SL_3$ is similar to the method of the master MA polling the slaves $SL_1$ and $SL_2$, as shown in the upper part of FIG. 1, and thus the related explanation will not be repeated again for brevity. As shown in the lower part of FIG. 1, the master MA can poll the slaves $SL_1$, $SL_2$, and $SL_3$ for one time every six time slots.

According to the illustration of FIG. 1, it can be known that when a master is to poll M slaves, the master has to send M polling packets in M polling time slots, respectively, and the period length of the master polling M slaves for one time is equal to (2×M) time slots, wherein M represents a positive integer. As a result, when the number of the slaves increases (M becomes larger), the number of the polling packets sent by the master increases. In this way, the transfer efficiency is reduced, causing a great inconvenience.

SUMMARY OF THE INVENTION

The present invention provides a polling method compliant to Bluetooth protocol for increasing transfer efficiency. The polling method comprises a master determining a first predetermined address as an instruction of a predetermined protocol, the master sending a polling packet having the first predetermined address to a plurality of slaves, and a set of slaves supporting the predetermined protocol responding to the polling packet in sequence. The predetermined protocol enables the master to send one single polling packet for the set of the slaves, which support the predetermined protocol, of the plurality of the slaves, responding in sequence. The master and the plurality of slaves belong to a Bluetooth piconet.

The present invention further provides a polling method compliant to Bluetooth protocol for increasing transfer efficiency. The polling method comprises a master sending a first polling packet in a first polling time slot, M slaves receiving the first polling packet, and the M slaves sending M first responding packets respectively in M first responding time slots according to M responding orders of the M slaves. The master and the M slaves belong to a Bluetooth piconet. The M first responding time slots are adjacent to each other, and a most preceding first responding time slot of the M first responding time slots is adjacent to the first polling time slot. A $K^{th}$ slave of the M slaves sends a $K^{th}$ first responding packet of the M first responding packets in a $K^{th}$ first responding slots of the M responding time slots according to a $K^{th}$ responding order of the M responding orders. A period length of each of the M first responding time slots and a period length of the first polling time slots are both equal to a cycle. K and M both represent positive integers, and $2 \leq K \leq M$.

The present invention further provides a polling system compliant to Bluetooth protocol for increasing transfer efficiency. The polling system comprises a master, and M slaves. The master is utilized for sending a first polling packet. The master sends the first polling packet in a first polling time slot. The M slaves are utilized for sending M first responding packets in M first responding time slots, respectively, according to the first polling packet and M responding orders of the M slaves. The M first responding time slots are adjacent to each other, and a most preceding first responding time slot of the M first responding time slots is adjacent to the first polling time slot. A $K^{th}$ slave of the M slaves sends a $K^{th}$ first responding packet of the M first responding packets in a $K^{th}$ first responding slots of the M responding time slots according to a $K^{th}$ responding order of the M responding orders. The master and the M slaves belong to a Bluetooth piconet. K and M both represent positive integers, and $2 \leq K \leq M$.

These and other objectives of the present invention will no doubt become obvious to those of ordinary skill in the art after reading the following detailed description of the preferred embodiment that is illustrated in the various figures and drawings.

DETAILED DESCRIPTION

The present invention provides a polling method that the master sets a predetermined address as the instruction of a predetermined protocol so that when the master sends a polling packet having the predetermined address to the slaves supporting the predetermined protocol, the supporting slaves can respond in sequence.

Since when the master polls the slaves by means of the predetermined protocol of the present invention, only the slaves supporting the predetermined protocol of the present invention respond. Therefore, initially, the master has to query each slave for determining if the slaves support the predetermined protocol. The method of the master determining if the slaves support the predetermined protocol is illustrated as below.

Figure 2:
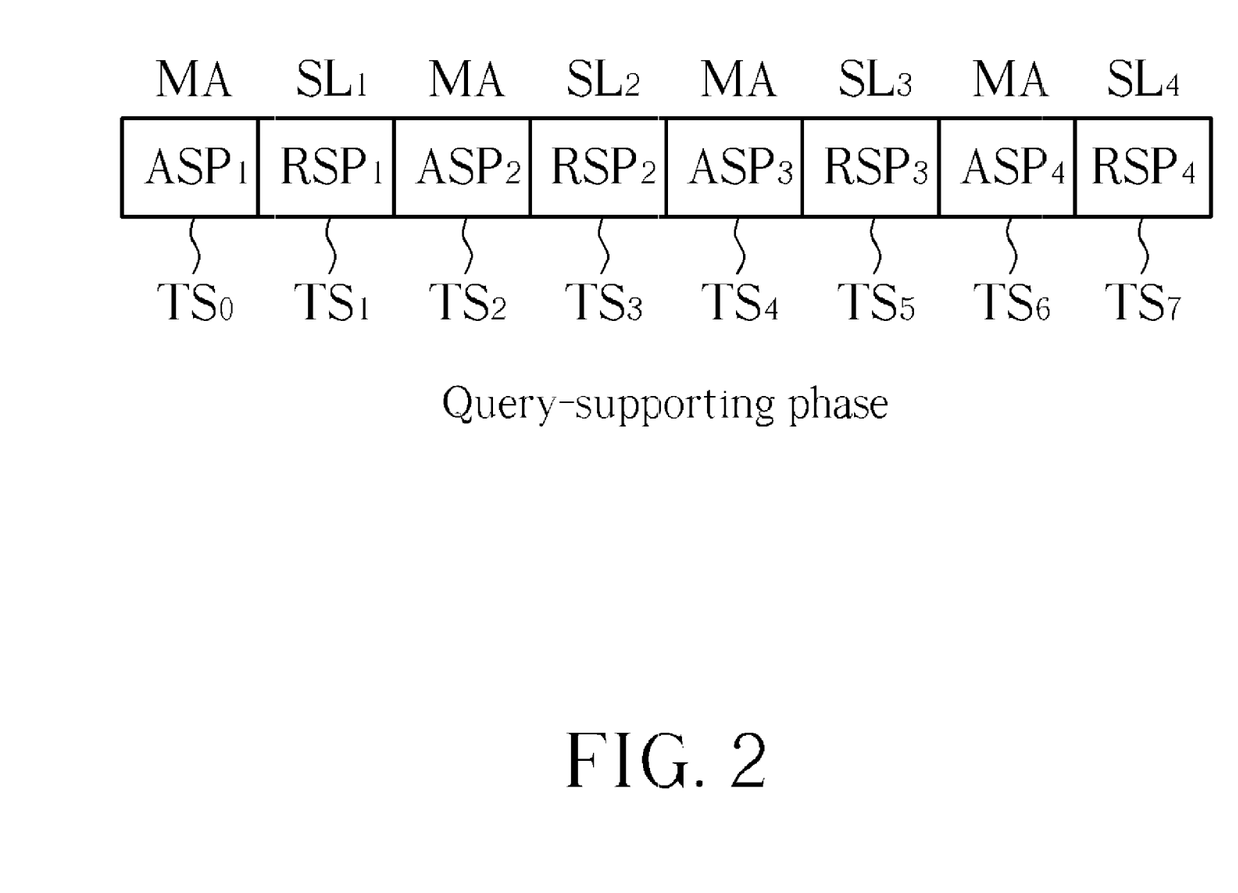
FIG. 2 is a diagram illustrating a master querying each slave for determining if the slaves supporting the predetermined protocol in a query-supporting phase of the present invention.

Please refer to FIG. 2. FIG. 2 is a diagram illustrating a master MA querying each slave for determining if the slaves support the predetermined protocol in a query-supporting phase of the present invention. Assuming the slaves $SL_1$, $SL_2$, $SL_3$, and $SL_4$ exist in the Bluetooth piconet NET that the master MA belongs to, and the slaves $SL_1$, $SL_2$, $SL_3$, and $SL_4$ are assigned the addresses $ADDR_1$, $ADDR_2$, $ADDR_3$, and $ADDR_4$, respectively. The period length of the time slots $TS_0 \sim TS_7$ are all equal to a cycle T (or Bluetooth time slot, for instance, 625 μs). The master MA sends a query-supporting packet $ASP_1$ having the address $ADDR_1$ in the time slot $TS_0$ for querying if the slave $SL_1$ corresponding to the address $ADDR_1$ supports the predetermined protocol. The slave $SL_1$ responds a respond-supporting packet $RSP_1$ for responding the query-responding packet $ASP_1$ in the time slot $TS_1$ adjacent to the time slot $TS_0$, wherein when the slave $SL_1$ supports the predetermined protocol, the respond-supporting packet $RSP_1$ sent by the slave $SL_1$ is equal to a predetermined data $DA_{PRE}$; otherwise, when the slave $SL_1$ does not support the predetermined protocol, the respond-supporting packet $RSP_1$ sent by the slave $SL_1$ is not equal to the predetermined data $DA_{PRE}$. Thus, the master MA can determine if the slave $SL_1$ supports the predetermined protocol based on the data of the respond-supporting packet $RSP_1$ sent by the slave $SL_1$. Similarly, as the description above-mentioned, the master MA sends a query-supporting packet $ASP_2$ having the address $ADDR_2$ in the time slot $TS_2$ for querying if the slave $SL_2$ corresponding to the address $ADDR_2$ supports the predetermined protocol. The slave $SL_2$ sends a respond-supporting packet $RSP_2$ for responding the query-supporting packet $ASP_2$ in the time slot $TS_3$ adjacent to the time slot $TS_2$. The master MA can determine if the slave $SL_2$ supports the predetermined protocol based on the data of the respond-supporting packet $RSP_2$ sent by the slave $SL_2$. The operation principle of the master MA determining if the slaves $SL_3$ and $SL_4$ support the predetermined protocol is similar, and hence will not be repeated again for brevity. It can be seen that the master MA can send query-supporting packets (querying commands) ASP to each slave, and determines which slaves support the predetermined protocol according to the data of the respond-supporting packet RSP responded by each slave. For example, when the respond-supporting packets $RSP_1 \sim RSP_3$ responded by the slaves $SL_1 \sim SL_3$ are all equal to the predetermined data $DA_{PRE}$, and the respond-supporting packet $RSP_4$ responded by the slaves $SL_4$ is not equal to the predetermined data $DA_{PRE}$, the master MA determines the slaves $SL_1 \sim SL_3$ support the predetermined protocol and the slave $SL_4$ does not support the predetermined protocol.

In addition, after the master MA determines the supporting slaves, the master MA assigns responding orders to the supporting slaves, so that when the master MA sends a polling packet of the predetermined protocol, the supporting slaves can respond in sequence according to their responding orders. The operation principle of the master polling each slave by means of the polling packet of the predetermined protocol is illustrated as below.

Figure 3:
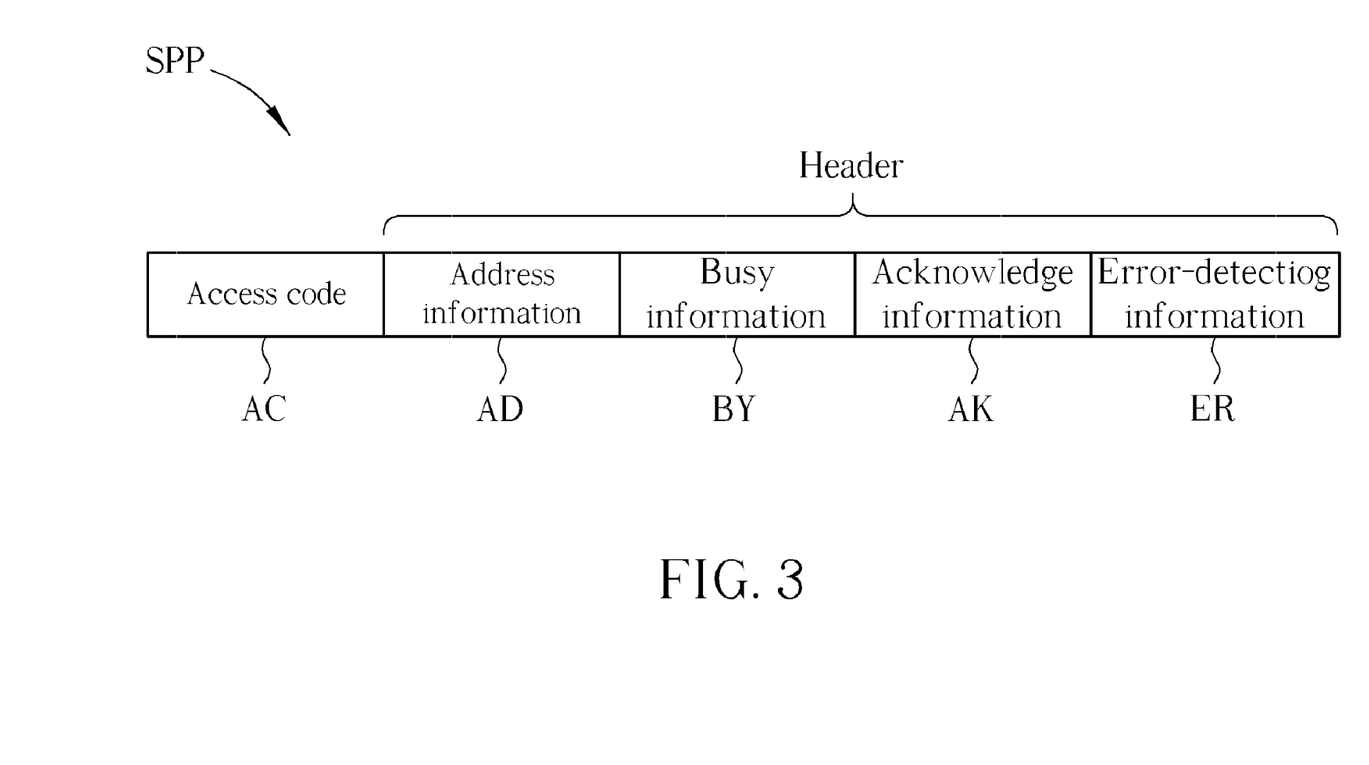
FIG. 3 is a diagram illustrating the format of a polling packet of the predetermined protocol of the present invention.

Please refer to FIG. 3. FIG. 3 is a diagram illustrating the format of a polling packet SPP of the predetermined protocol of the present invention. The polling packet SPP comprises an access code AC, and a header HD. The access code AC is utilized for indicating the Bluetooth piconet NET that the polling packet SPP belongs to so that the slaves belong to the Bluetooth piconet NET can receive the polling packet SPP. The header HD comprises an address information AD, a busy information BY, an acknowledge (ACK) information AK, and an error-detecting information ER. It is assumed that the master MA sets an address $ADDR_{PRE}$ as the predetermined address. That is, the master MA reserves the address $ADDR_{PRE}$ for the predetermined protocol instead of assigning the address $ADDR_{PRE}$ to a slave. In this way, in the address information AD of the polling packet SPP, the predetermined address $ADDR_{PRE}$ is stored so that the slaves supporting the predetermined protocol can determine if the polling packet SPP is the packet of the predetermined protocol and can accordingly respond. The busy information BY is utilized for instructing the slaves to transfer data. The acknowledge information AK is utilized for indicating if the responding packets sent by the slaves are successfully transmitted. The error-detecting information ER is provided to the slaves for determining if the polling packet SPP is incorrect.

Figure 4:
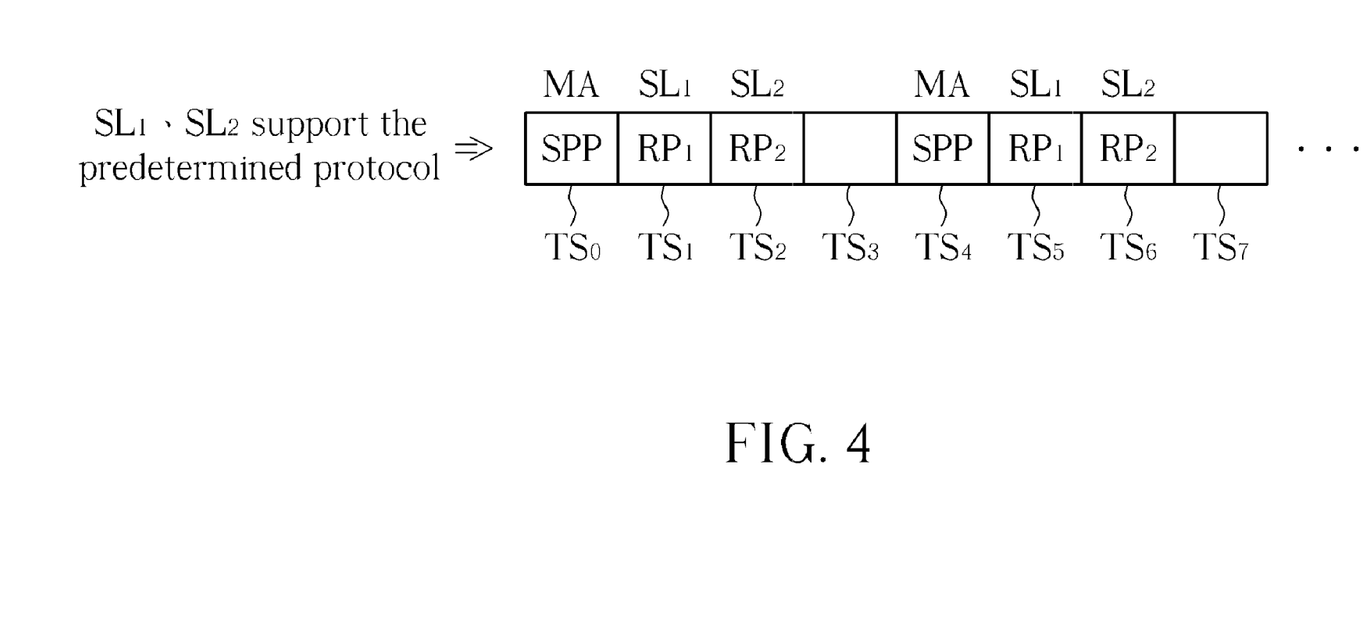
FIG. 4 is a diagram illustrating the master polling two slaves by means of the polling packet of the predetermined protocol.

Please refer to FIG. 4. FIG. 4 is a diagram illustrating the master MA polling two slaves $SL_1$ and $SL_2$ by means of the polling packet SPP of the predetermined protocol. In FIG. 4, the period length of the time slots $TS_0 \sim TS_7$ are all equals to one cycle T (for example, 625 μs). The master MA and the slaves $SL_1$, and $SL_2$ belong to the same Bluetooth piconet NET. It is assumed that the master MA assigns the addresses $ADDR_1$, and $ADDR_2$ to the slaves $SL_1$, and $SL_2$, respectively, wherein the addresses $ADDR_1$, and $ADDR_2$ are both different from the predetermined address $ADDR_{PRE}$. The master MA has already determined that the slaves $SL_1$ and $SL_2$ support the predetermined protocol by means of the method illustrated in FIG. 2, and the master MA has assigned the responding orders $ORD_1$ and $ORD_2$ to the slaves $SL_1$ and $SL_2$, respectively. At first, the master MA sends the polling packet SPP (as shown in FIG. 3) in the polling time slot $TS_0$. Since the slaves $SL_1$ and $SL_2$ support the predetermined protocol, when the slaves $SL_1$ and $SL_2$ receive the polling packet SPP, the slaves $SL_1$ and $SL_2$ determine that the polling packet SPP is a polling packet of the predetermined protocol because the polling packet SPP has the predetermined address $ADDR_{PRE}$. The slaves $SL_1$ and $SL_2$ respond in sequence according to their responding orders $ORD_1$ and $ORD_2$ assigned by the master MA. For instance, the responding order $ORD_1$ is equal to 1, and the responding order $ORD_2$ is equal to 2. Thus, the slaves $SL_1$ sends the responding packet $RP_1$ in the responding time slot $TS_1$ adjacent to the polling time slot $TS_0$, and the slaves $SL_2$ sends the responding packet $RP_2$ in the responding time slot $TS_2$ separated from the polling time slot $TS_0$ by one cycle T (or one time slot). In this way, the master MA only has to send a single polling packet SPP for the slaves $SL_1$ and $SL_2$ responding in sequence. It is noticeable that after the slave $SL_2$ sends the responding packet $RP_2$ in the responding time slot $TS_2$, the master MA does not send the polling packet SPP in the time slot $TS_3$ adjacent to the responding time slot $TS_2$ according to the present invention. This is because in the Bluetooth protocol, the master MA only can transfer data (or send packet) in even time slots. As shown in FIG. 4, the time slots $TS_0$, $TS_2$, $TS_4$, and so on are even time slots, and the time slots $TS_1$, $TS_3$, $TS_5$, and so on are odd time slots. Hence, instead of sending the polling packet SPP in the odd time slot $TS_3$, the master MA sends the polling packet SPP in the polling time slot $TS_4$ separated from the responding time slot $TS_2$ by one cycle T (or one time slot) according to the present invention, for conforming to the Bluetooth protocol. Besides, the acknowledge information AK of the polling packet SPP sent by the master MA in the polling time slot $TS_4$ indicates if the responding packet $RP_1$ and the responding packet $RP_2$ respectively sent by the slave $SL_1$ and $SL_2$ in the responding time slots $TS_1$ and $TS_2$ are successfully transmitted.

Figure 5:
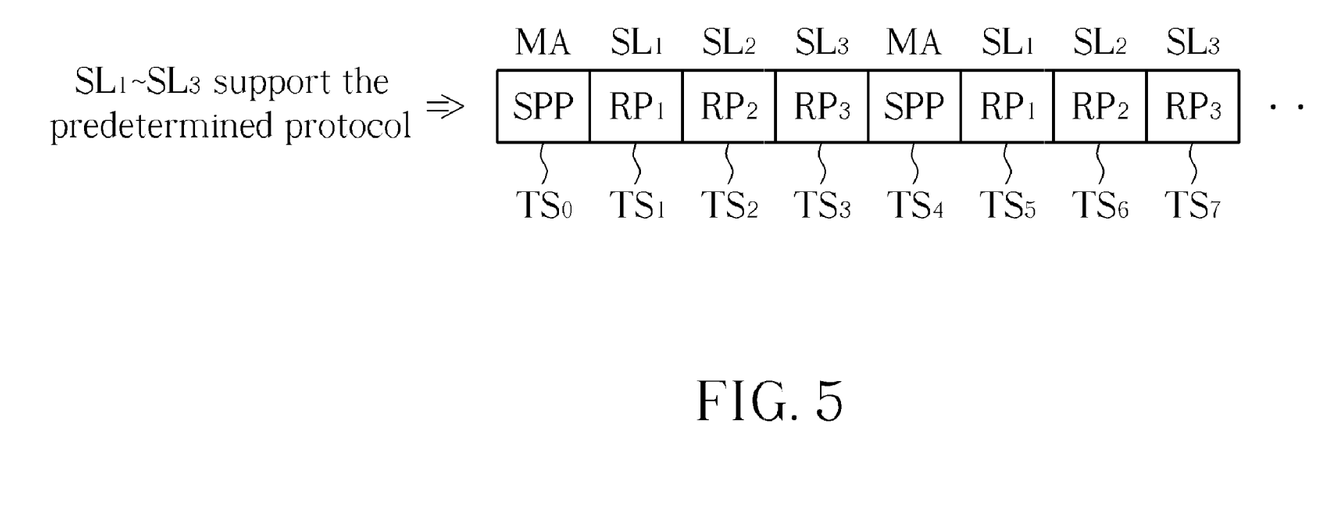
FIG. 5 is a diagram illustrating the master polling three slaves by means of the polling packet of the predetermined protocol.

Please refer to FIG. 5. FIG. 5 is a diagram illustrating the master MA polling three slaves $SL_1$, $SL_2$, and $SL_3$ by means of the polling packet SPP of the predetermined protocol of the present invention. The master MA and the slaves $SL_1$, $SL_2$, and $SL_3$ belong to the same Bluetooth piconet NET. It is assumed that the master MA assigns the addresses $ADDR_1$, $ADDR_2$, and $ADDR_3$ to the slaves $SL_1$, $SL_2$, and $SL_3$, respectively, wherein the addresses $ADDR_1$, $ADDR_2$, and $ADDR_3$ are all different from the predetermined address $ADDR_{PRE}$. The master MA has already determined that the slaves $SL_1$, $SL_2$ and $SL_3$ support the predetermined protocol by means of the method illustrated in FIG. 2, and the master MA has assigned the responding orders $ORD_1$, $ORD_2$, and $ORD_3$ to the slaves $SL_1$, $SL_2$, and $SL_3$, respectively. At first, the master MA sends the polling packet SPP shown in FIG. 3 in the polling time slot $TS_0$. The slaves $SL_1$, $SL_2$, and $SL_3$ respond in sequence according to their responding orders $ORD_1$, $ORD_2$, and $ORD_3$ assigned by the master MA. For instance, the responding order $ORD_1$ is equal to 1, the responding order $ORD_2$ is equal to 2, and the responding order $ORD_3$ is equal to 3. Thus, the slaves $SL_1$ sends the responding packet $RP_1$ in the responding time slot $TS_1$ adjacent to the polling time slot $TS_0$; the slaves $SL_2$ sends the responding packet $RP_2$ in the responding time slot $TS_2$ separated from the polling time slot $TS_0$ by one cycle T (or one time slot); the slaves $SL_3$ sends the responding packet $RP_3$ in the responding time slot $TS_3$ separated from the polling time slot $TS_0$ by two cycles T (or two time slots). In this way, the master MA only has to send one single polling packet SPP for the slaves $SL_1$, $SL_2$, and $SL_3$ responding in sequence. It is noticeable that, compared with FIG. 4, since the time slot $TS_4$ is an even time slot, the master MA sends the polling packet SPP in the time slot $TS_4$ adjacent to the responding time slot $TS_3$. In addition, compared with the prior art, the period length of the master MA polling the slaves $SL_1$, $SL_2$, and $SL_3$ one time is reduced to be four time slots by means of the method of the present invention, improving the transfer efficiency.

Figure 6:
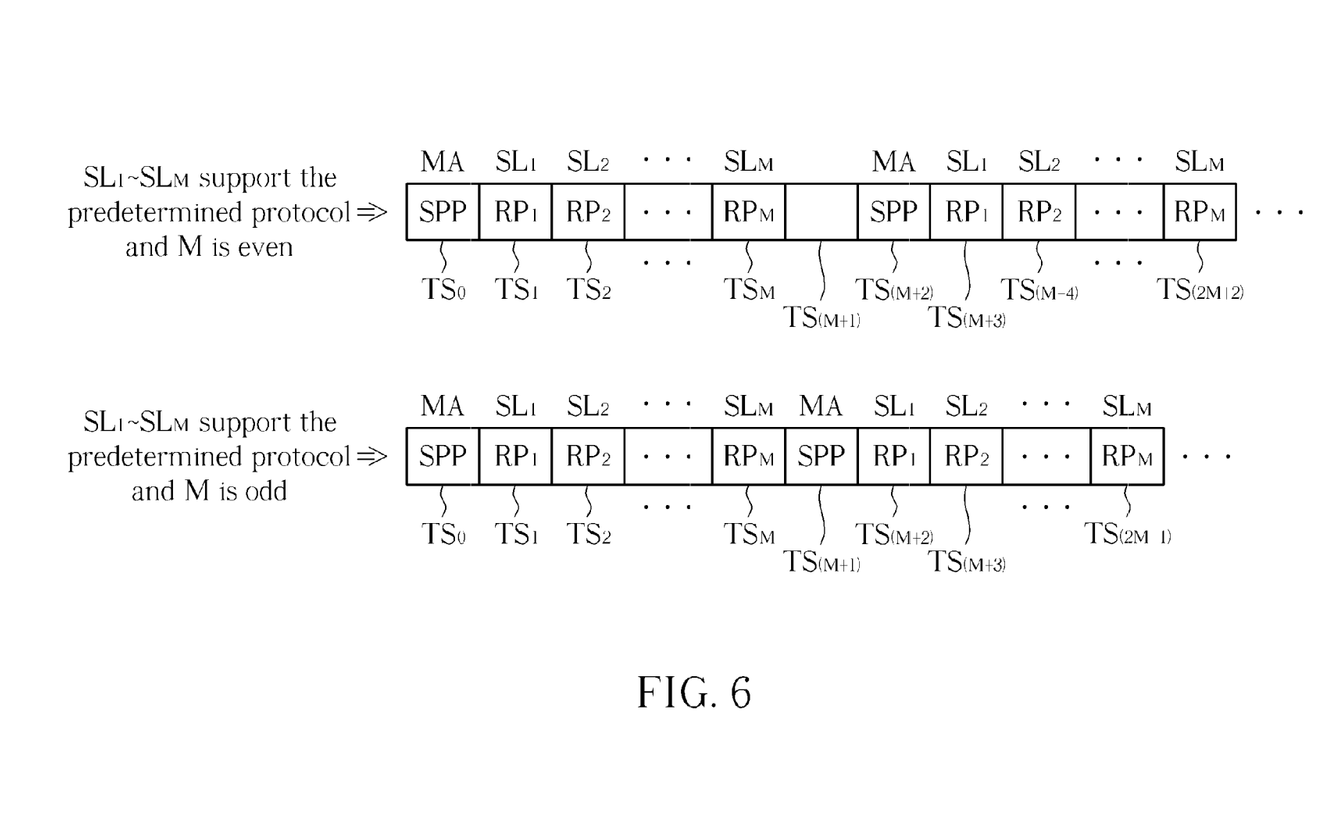
FIG. 6 is a diagram illustrating the master polling M slaves by means of the polling packet of the predetermined protocol.

Please refer to FIG. 6. FIG. 6 is a diagram illustrating the master MA polling M slaves $SL_1$~$SL_M$ by means of the polling packet SPP of the predetermined protocol of the present invention. The master MA and the slaves $SL_1$~$SL_M$ belong to the same Bluetooth piconet NET. It is assumed that the master MA assigns the addresses $ADDR_1$~$ADDR_M$ to the slaves $SL_1$~$SL_M$, respectively, wherein the addresses $ADDR_1$~$ADDR_M$ are all different from the predetermined address $ADDR_{PRE}$. The master MA has already determined that the slaves $SL_1$~$SL_M$ support the predetermined protocol by means of the method illustrated in FIG. 2, and the master MA has assigned the responding orders $ORD_1$~$ORD_M$ to the slaves $SL_1$~$SL_M$, respectively. The operation principle of the master MA polling the slaves $SL_1$~$SL_M$ is similar to those illustrated in FIG. 4 and FIG. 5, and thus will not be repeated again. In the upper part of FIG. 6, it is assumed that M is even. After the master MA sends the polling packet SPP in the polling time slot $TS_0$, the slaves $SL_1$~$SL_M$ send responding packet $RP_1$~$RP_M$ in the responding time slots $TS_1$~$TS_M$, respectively, according to the responding orders $ORD_1$~$ORD_M$. Since the time slot $TS_{(M+1)}$ is an odd time slot, the master MA does not send the polling packet SPP in the time slot $TS_{(M+1)}$ for conforming to the Bluetooth protocol. As a result, the period length of the master MA polling the slaves $SL_1$~$SL_M$ one time is equal to (M+2) time slots. In the lower part of FIG. 6, it is assumed that M is odd. After the master MA sends the polling packet SPP in the polling time slot $TS_0$, the slaves $SL_1$~$SL_M$ send responding packet $RP_1$~$RP_M$ in the responding time slots $TS_1$~$TS_M$, respectively, according to the responding orders $ORD_1$~$ORD_M$. Since the time slot $TS_{(M+1)}$ is an even time slot, the master MA can send the polling packet SPP in the time slot $TS_{(M+1)}$. In this way, the period length of the master MA polling the slaves $SL_1$~$SL_M$ one time is equal to (M+1) time slots.

In the prior art, the period length of the master MA polling the slaves $SL_1$~$SL_M$ is equal to (2×M) time slots. However, by means of the method of the present invention, when M is odd, the period length of the master MA polling the slaves $SL_1$~$SL_M$ is equal to (M+1) time slots; when M is even, the period length of the master MA polling the slaves $SL_1$~$SL_M$ is equal to (M+2) time slots. It can be seen that when M≧3, the period length of the master MA polling the slaves $SL_1$~$SL_M$ one time can be reduced by means of the method of the present invention.

Figure 7:
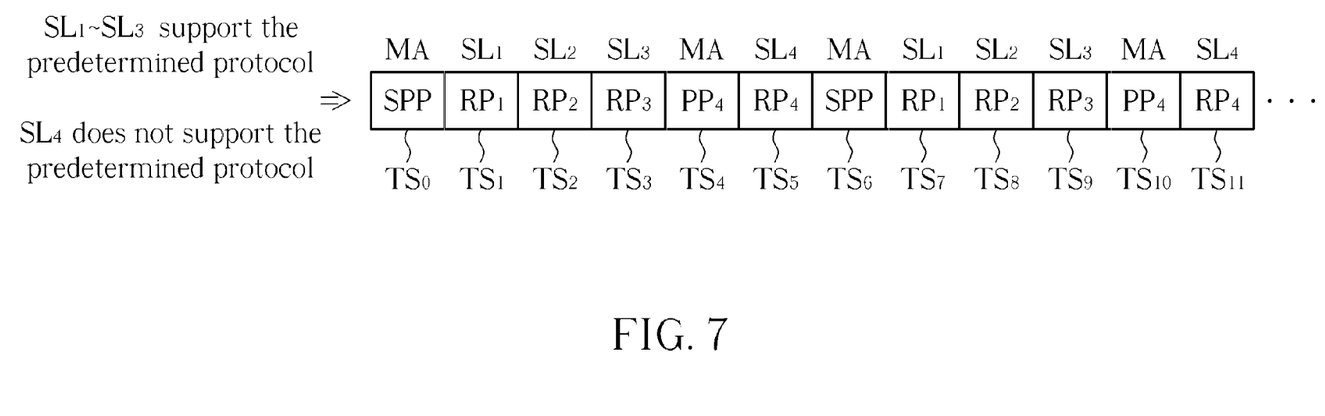
FIG. 7 is a diagram illustrating the polling method of the master when a Bluetooth piconet has slaves supporting predetermined protocol and slaves not supporting predetermined protocol at the same time.

Please refer to FIG. 7. FIG. 7 is a diagram illustrating the polling method of the master MA when the Bluetooth piconet NET has the slaves supporting predetermined protocol and the slaves not supporting predetermined protocol at the same time. In FIG. 7, it is assumed that the master MA assigns the addresses $ADDR_1$~$ADDR_4$ to the slaves $SL_1$~$SL_4$, respectively, wherein the addresses $ADDR_1$~$ADDR_4$ are all different from the predetermined address $ADDR_{PRE}$. The master MA has already determined that the slaves $SL_1$, $SL_2$ and $SL_3$ support the predetermined protocol, and the $SL_4$ does not support the predetermined protocol, by means of the method illustrated in FIG. 2. Consequently, the master MA assigns the responding orders $ORD_1$~$ORD_3$ to the slaves $SL_1$~$SL_3$, respectively. Similar to the operation principle illustrated in FIG. 5, the master MA can send the polling packet SPP in the polling time slot $TS_0$ for polling the supporting slaves $SL_1$~$SL_3$ one time. In this way, the slaves $SL_1$~$SL_3$ send responding packets $RP_1$~$RP_3$ in the responding time slots $TS_1$~$TS_3$ according their responding orders $ORD_1$~$ORD_3$ assigned by the master MA. Since the time slot $TS_4$ is an even time slot, the master MA can send a conventional polling packet $PP_4$ in the polling time slot $TS_4$, wherein the polling packet $PP_4$ has an address $ADDR_4$. The slave $SL_4$ can determine the master MA requests the slave $SL_4$ to respond based on the address $ADDR_4$ of the polling packet $PP_4$. In this way, the slave $SL_4$ sends a responding packet $RP_4$ corresponding to the polling packet $PP_4$ in the responding time slot $TS_5$ adjacent to the polling time slot $TS_4$. Therefore, the master MA polls the slaves $SL_1$~$SL_3$ supporting the predetermined protocol and the slave $SL_4$ not supporting the predetermined protocol by means of the polling packet SPP of the predetermined protocol of the present invention and the conventional polling packet $PP_4$, respectively. That is, even if the Bluetooth piconet NET has the slaves supporting predetermined protocol and the slaves not supporting predetermined protocol at the same time, the master MA still can poll all the slaves in the Bluetooth piconet NET.

Figure 8:
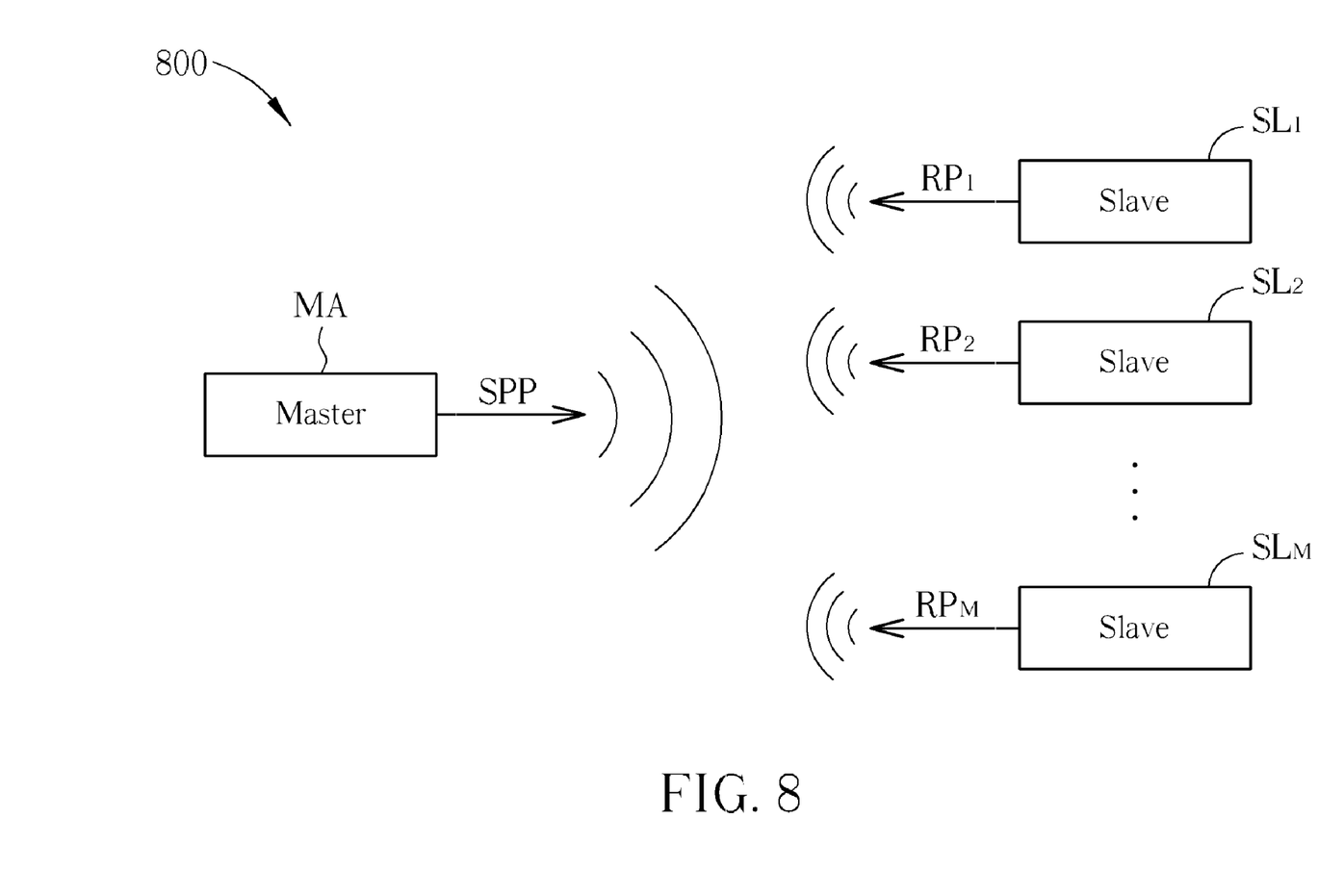
FIG. 8 is a diagram illustrating a polling system capable of improving the transfer efficiency and conforming to the Bluetooth protocol according to the present invention.

Please refer to FIG. 8. FIG. 8 is a diagram illustrating a polling system 800 capable of improving the transfer efficiency and compliant to the Bluetooth protocol according to the present invention. The polling system 800 comprises a master MA, and slaves $SL_1$~$SL_M$, wherein the slaves $SL_1$~$SL_M$ support the predetermined protocol. In the polling system 800, after the master MA determines the slaves $SL_1$~$SL_M$ support the predetermined protocol, the master MA can send the polling packet SPP of the predetermined protocol in the time slot $TS_0$ for the slaves $SL_1$~$SL_M$ sending the responding packets $RP_1$~$RP_M$ respectively in the responding time slots $TS_1$~$TS_M$, by means of the method illustrated in FIG. 6. In this way, in the polling system 800, when M is odd, the period length of the master MA polling the slaves $SL_1$~$SL_M$ is equal to (M+1) time slots; when M is even, the period length of the master MA polling the slaves $SL_1$~$SL_M$ is equal to (M+2) time slots.

In conclusion, the master queries each slave to determine the slaves supporting a predetermined protocol, according to the polling method provided by the present invention. The master determines a predetermined address as the instruction of the predetermined protocol. When the master sends a single polling packet with the predetermined address to the supporting slaves, the supporting slaves can respond in sequence. Thus, even the number of the supporting slaves increases, the master only has to send one single polling packet for all the supporting slaves sending responding packets. In this way, the transfer efficiency of the master polling the slaves is improved, providing a great convenience.

Those skilled in the art will readily observe that numerous modifications and alterations of the device and method may be made while retaining the teachings of the invention.

What is claimed is:

1. A polling method compliant to Bluetooth protocol for increasing transfer efficiency, comprising:
   a master determining a first predetermined address as an instruction of a predetermined protocol;
      wherein the predetermined protocol enables the master to send one single polling packet for a set of slaves, which support the predetermined protocol, of a plurality of slaves, responding in sequence;
      wherein the master and the plurality of slaves belong to a Bluetooth piconet;
   the master sending a polling packet having the first predetermined address to the plurality of the slaves; and
   the set of the slaves supporting the predetermined protocol responding to the polling packet in sequence.

2. The polling method of claim 1, wherein the polling method further comprising:
   the master querying the plurality of the slaves to determine the set of the slaves supporting the predetermined protocol.

3. The polling method of claim 2, wherein the master queries the plurality of the slaves to determine the set of the slaves supporting the predetermined protocol comprises:
   the master sending a plurality of querying commands corresponding to the plurality of the slaves;
   the plurality of the slaves send a plurality of respond-supporting packets corresponding to the plurality of the querying commands, respectively; and
   the master determining the set of the slaves supporting the predetermined protocol according to the plurality of the respond-supporting packets and a predetermined data.

4. The polling method of claim 3, wherein when a first and a second respond-supporting packets of the plurality of the respond-supporting packets are equal to the predetermined data, the master determines a first slave corresponding to the first respond-supporting packet, and a second slave corresponding to the second respond-supporting packet support the predetermined protocol.

5. The polling method of claim 4, wherein when the master sends the polling packet having the first predetermined address, the first slave sends a first responding packet in a first responding time slot, and the second slave sends a second responding packet in a second respond time slot; a period length of the first responding time slot is equal to the second responding time slot, and the first responding time slot is adjacent to the second responding time slot.

6. The polling method of claim 3, wherein when a third respond-supporting packet of the plurality of the respond-supporting packets is not equal to the predetermined data, the master determines a third slave corresponding to the respond-supporting packet of the plurality of the respond-supporting packets does not support the predetermined protocol.

7. The polling method of claim 6, wherein when the master sends a second polling packet having an address of the third slave, the third slave sends a third responding packet in a third responding time slot.

8. A polling method compliant to Bluetooth protocol for increasing transfer efficiency, comprising:
   a master sending a first polling packet in a first polling time slot;
   M slaves receiving the first polling packet;
      wherein the master and the M slaves belong to a Bluetooth piconet; and
   the M slaves sending M first responding packets respectively in M first responding time slots according to M responding orders of the M slaves;
      wherein the M first responding time slots are adjacent to each other, and a most preceding first responding time slot of the M first responding time slots is adjacent to the first polling time slot;
      wherein a $K^{th}$ slave of the M slaves sends a $K^{th}$ first responding packet of the M first responding packets in a $K^{th}$ first responding slots of the M responding time slots according to a $K^{th}$ responding order of the M responding orders;
      wherein a period length of each of the M first responding time slots and a period length of the first polling time slots are both equal to a cycle;
      wherein K and M both represent positive integers, and $2 \leq K \leq M$.

9. The polling method of claim 8, wherein the first polling packet comprises:
   a first access code, for indicating the first polling packet belonging to the Bluetooth piconet; and
   a first header, comprising:
      a first address information, for storing a first predetermined address;

a first busy information, for instructing the M slaves to transfer data;

a first acknowledge (ACK) information, for indicating if M second responding packets sent by the M slaves before the first polling time slot are successfully transmitted; and a first error-detecting information, for providing to the M slaves to determine if the first polling packet is incorrect.

10. The polling method of claim 9, wherein a $K^{th}$ slave of the M slaves has a $K^{th}$ address of M addresses;

wherein the $K^{th}$ address of the M addresses is different from the first predetermined address.

11. The polling method of claim 10, further comprising the master sending a second polling packet in a second polling time slot;

wherein the second polling packet comprises:
a second access code, for indicating the second polling packet belonging to the Bluetooth piconet; and
a second header, comprising:
a second address information, for storing the first predetermined address;
a second busy information, for instructing the M slaves to transfer data;
a second acknowledge information, for indicating if the M first responding packets sent by the M slaves are successfully transmitted; and
a second error-detecting information, for providing to the M slave to determine if the second polling packet is incorrect;
wherein a period length of the second polling time slot is equal to the cycle.

12. The polling method of claim 11, wherein when M is odd, the second polling time slot is adjacent to a most posterior first responding slot of the M first responding time slots; when M is even, the second polling time slot is separated from the most posterior first responding slot of the M first responding time slots by the cycle.

13. The polling method of claim 8, further comprising:
the master querying all slaves belonging to the Bluetooth piconet so as to determine that the M slaves support responding the first polling packet according to responses of all slaves of the Bluetooth piconet.

14. A polling system compliant to Bluetooth protocol for increasing transfer efficiency, comprising:
a master, for sending a first polling packet;
wherein the master sends the first polling packet in a first polling time slot; and
M slaves, for sending M first responding packets in M first responding time slots, respectively, according to the first polling packet and M responding orders of the M slaves;
wherein the M first responding time slots are adjacent to each other, and a most preceding first responding time slot of the M first responding time slots is adjacent to the first polling time slot;
wherein a $K^{th}$ slave of the M slaves sends a $K^{th}$ first responding packet of the M first responding packets in a $K^{th}$ first responding slots of the M responding time slots according to a $K^{th}$ responding order of the M responding orders;
wherein the master and the M slaves belong to a Bluetooth piconet;
wherein K and M both represent positive integers, and $2 \leq K \leq M$.

15. The polling system of the claim 14, wherein the first polling packet comprises:
a first access code, for indicating the first polling packet belonging to the Bluetooth piconet; and
a first header, comprising:
a first address information, for storing a first predetermined address;
a first busy information, for instructing the M slaves to transfer data;
a first acknowledge information, for indicating if M second responding packets sent by the M slaves before the first polling time slot are successfully transmitted; and
a first error-detecting information, for providing to the M slaves to determine if the first polling packet is incorrect.

16. The polling system of the claim 15, wherein the $K^{th}$ slave of the M slaves has a $K^{th}$ address of M addresses, and the $K^{th}$ address of the M addresses is different from the first predetermined address.

17. The polling system of the claim 16, wherein the master sends a second polling packet in a second polling time slot, and the second polling packet comprises:
a second access code, for indicating the second polling packet belonging to the Bluetooth piconet; and
a second header, comprising:
a second address information, for storing the first predetermined address;
a second busy information, for instructing the M slaves to transfer data;
a second acknowledge information, for indicating if the M first responding packets sent by the M slaves are successfully transmitted; and
a second error-detecting information, for providing to the M slaves to determine if the second polling packet is incorrect;
wherein a period length of the second polling time slot is equal to the cycle.

18. The polling system of claim 17, wherein when M is odd, the second polling time slot is adjacent to a most posterior first responding slot of the M first responding time slots; when M is even, the second polling time slot is separated from the most posterior first responding slot of the M first responding time slots by the cycle.

19. The polling system of claim 14, wherein the master queries all slaves belonging to the Bluetooth piconet, and determines that the M slaves support responding the first polling packet according to responses of all slaves of the Bluetooth piconet.

* * * * *